United States Patent
Matlschweiger

(10) Patent No.: US 8,548,752 B2
(45) Date of Patent: Oct. 1, 2013

(54) SYSTEM FOR INVESTIGATING COLLISIONS BETWEEN TEST BODY AND PHYSICAL STRUCTURE

(76) Inventor: Klaus Matlschweiger, Fernitz (AT)

( * ) Notice: Subject to any disclaimer, the term of this patent is extended or adjusted under 35 U.S.C. 154(b) by 286 days.

(21) Appl. No.: 12/918,115

(22) PCT Filed: Feb. 18, 2009

(86) PCT No.: PCT/EP2009/001170
§ 371 (c)(1),
(2), (4) Date: Oct. 7, 2010

(87) PCT Pub. No.: WO2009/103518
PCT Pub. Date: Aug. 27, 2009

(65) Prior Publication Data
US 2011/0035162 A1 Feb. 10, 2011

(30) Foreign Application Priority Data
Feb. 18, 2008 (EP) ..................... 08002954

(51) Int. Cl.
*G06F 15/00* (2006.01)
*G01M 7/00* (2006.01)
(52) U.S. Cl.
USPC .......................................... 702/41; 73/12.04
(58) Field of Classification Search
USPC .................. 702/41; 701/1, 36, 45; 280/734, 280/735; 73/12.04
See application file for complete search history.

(56) References Cited

U.S. PATENT DOCUMENTS

| | | | |
|---|---|---|---|
| 5,922,937 A | 7/1999 | Kowalski | |
| 6,035,728 A * | 3/2000 | Jost | 73/865.3 |
| 6,609,409 B1 | 8/2003 | Bock | |
| 7,762,583 B2 * | 7/2010 | Federspiel | 280/735 |
| 2003/0140708 A1 | 7/2003 | Chen | |

FOREIGN PATENT DOCUMENTS

| | | |
|---|---|---|
| DE | 10104192 A1 | 8/2002 |
| DE | 10339409 B3 | 10/2004 |
| EP | 0994338 A | 4/2000 |

* cited by examiner

*Primary Examiner* — Bryan Bui
(74) *Attorney, Agent, or Firm* — Robert A. Blaha; Smith Risley Tempel Santos LLC

(57) ABSTRACT

A device for investigating a collision between a test body and a physical structure, wherein the device comprises a mounting unit for mounting the test body, an electric drive unit adapted for mechanically driving the mounting unit and the test body mounted thereon, and a control unit adapted for controlling the electric drive unit to accelerate the test body mounted on the mounting unit and for controlling release of the test body from the mounting unit to direct the accelerated test body towards the physical structure for collision, wherein the device is adapted so that the mounting unit and the test body mounted thereon are mechanically driven exclusively by the electric drive unit.

18 Claims, 6 Drawing Sheets

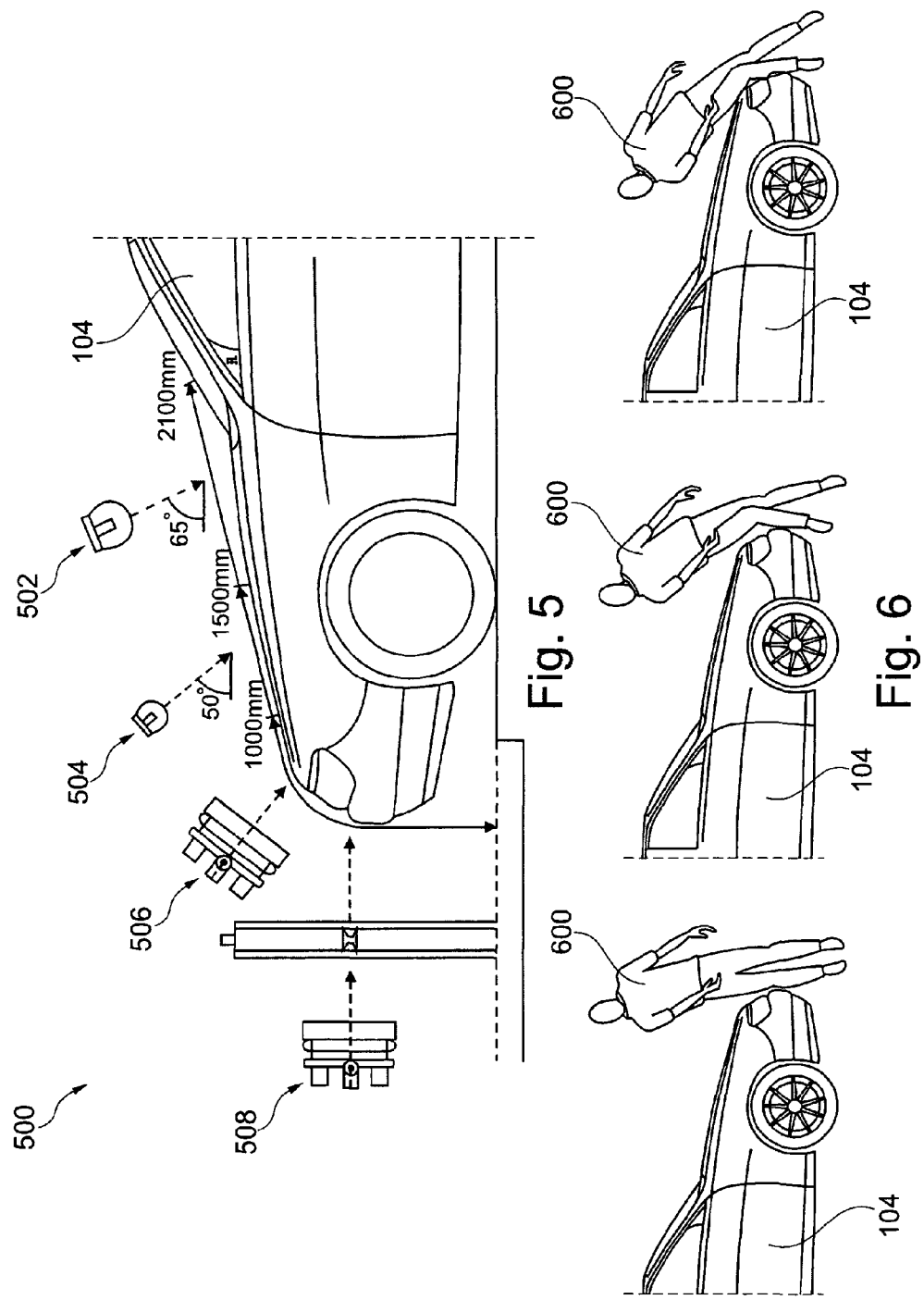

SYSTEM FOR INVESTIGATING COLLISIONS BETWEEN TEST BODY AND PHYSICAL STRUCTURE

CROSS REFERENCE TO RELATED APPLICATIONS

This application claims the benefit of the filing date of European Patent Application No. 08002954.9 filed Feb. 18, 2008, the disclosure of which is hereby incorporated herein by reference.

TECHNICAL FIELD

The invention relates to a device for investigating a collision between a test body and a physical structure.

Beyond this, the invention relates to a method of investigating a collision between a test body and a physical structure.

Moreover, the invention relates to a program element.

Furthermore, the invention relates to a computer-readable medium.

BACKGROUND

Physical tests for simulating a crash between a vehicle and pedestrians or a vehicle and its occupants are a powerful tool for developing improvements of technical devices and may be helpful in product development and failure analysis.

Various legal and industrial regulations exist which need to be fulfilled in order to accept a vehicle as sufficiently safe. Examples are 2003/102 EG, EEVC WG17, FMVSS, ACEA, JAMA, or EuroNCAP. Directive 2003/102 EG, for instance, regards the protection of pedestrians and other vulnerable road users before and in the event of a collision with a motor vehicle.

DE 103 39 409 discloses a shooting device for accelerating a test body under pre-selected conditions against a fixed object, which is part of a vehicle, in an acceleration direction. The test body has a linear moving carrier on which it is held using a mounting. The carrier is linked with the inductor cam of a linear motor to permit control of its firing velocity. The cam moves along a reaction bar that is parallel to the carrier guide.

DE 101 04 192 discloses a holder which holds a test body. The holder is provided with a carrier which can be accelerated. The carrier can be selectively operated in either a free-flight mode or a guided mode. At least part of the accelerated carrier carrying the holder is movable in the guided mode until the test body collides with the object, and can be braked in the free-flight mode prior to the collision.

However, conventional crash test systems may be inaccurate, time consuming or inconvenient in use.

SUMMARY

It is an object of the invention to provide a crash test system which provides for a sufficiently fast and accurate data accumulation and which is operable conveniently by a user.

In order to achieve the object defined above, a device for investigating a collision between a test body and a physical structure, a method of investigating a collision between a test body and a physical structure, a program element, and a computer-readable medium according to the independent claims are provided.

According to an exemplary embodiment of the invention, a device for investigating (or controlling) a collision between a test body (such as a technical member having similar properties as a human or a body part of a human) and a physical structure (such as a car or car components or any other vehicle) is provided, wherein the device comprises a mounting unit (such as a receptacle) for mounting the test body (for instance, corresponding provisions may be made at the mounting unit and at the test body allowing to mount the test body sufficiently firm to guarantee that the test body follows a motion of the mounting unit and sufficiently loose that the test body continues a motion and is separated from the mounting unit when a certain threshold force is exceeded or a respective trigger is initiated), an electric drive unit (particularly one or more linear electric motors) adapted for mechanically driving the mounting unit and the test body mounted thereon, and a control unit (which may, for instance, operate in accordance with a predefined operation scheme or a user-defined operation scheme) adapted for controlling the electric drive unit to accelerate the test body mounted on the mounting unit (for instance in such a manner that the test body has a target velocity in a target direction at a target position) and for controlling release of the test body from the mounting unit (for instance in a manner that the mounting unit and the test body do not continue joint or mutual motion with the mounting) to direct the accelerated test body towards the physical structure for collision.

According to another exemplary embodiment of the invention, a method of investigating a collision between a test body and a physical structure is provided, wherein the method comprises mechanically driving a mounting unit and a test body mounted thereon by an electric drive unit, and controlling the electric drive unit to accelerate the test body mounted on the mounting unit and to release the test body from the mounting unit to direct the accelerated test body towards the physical structure for collision.

According to yet another exemplary embodiment of the invention, a computer-readable medium (for instance a CD, a DVD, a USB stick, a floppy disk or a harddisk) is provided, in which a computer program of investigating a collision between a test body and a physical structure is stored which, when being executed by a processor, is adapted to control or carry out a method having the above mentioned features.

According to still another exemplary embodiment of the invention, a program element (for instance a software routine, in source code or in executable code) of investigating a collision between a test body and a physical structure is provided, which program element, when being executed by a processor, is adapted to control or carry out a method having the above mentioned features.

Data processing for crash test purposes which may be performed according to embodiments of the invention can be realized by a computer program, that is by software, or by using one or more special electronic optimization circuits, that is in hardware, or in hybrid form, that is by means of software components and hardware components.

The term "physical structure" may particularly denote any object (particularly any technical apparatus, member, or a portion thereof) in the real world which may be under development or analysis and shall therefore be investigated by a collision test. Thus, during the analysis, a physical property of the physical structure may be investigated. Such a physical structure may be a vehicle, particularly a car, which may require to pass certification tests to be approved or to meet industrial or legal standards regarding quality or safety.

The term "test body" may particularly denote a physical structure in the real world which can simulate a possible partner or victim of a collision, for instance a body or a body part of a human being or an animal. Thus, the size, the weight, the shape and/or an orientation with respect to the physical structure may be configured for the purpose of a realistic crash simulation in accordance with anatomical frame conditions.

The term "electric drive unit" may particularly denote any electric motor which directly generates a force directly exerted on the mounting unit and, in turn, on a test body mounted on the mounting unit, particularly without interconnecting or interposing a hydraulic or pneumatic force generator between drive unit and mounting unit. Thus, the device may be free of a hydraulic or pneumatic component. Hence, such an electric drive unit may be an engine for doing work using electricity, or a motor that converts electricity (preferably directly) to mechanical work.

According to an exemplary embodiment of the invention, a crash test device may be provided which brings a test body to a velocity with respect to a (for instance in a lab system spatially fixed) physical structure such as a car or any other vehicle, so as to perform a collision or crash between the test body and the physical structure (under well-defined conditions) as it may occur in a real world accident between a pedestrian/car occupant and a vehicle. By providing an electric drive unit such as an electric motor for performing the acceleration, a proper control or regulation of the velocity characteristics is possible so that a better control of the motion characteristics of the test body may be achieved as compared to conventional approaches in which pneumatic or hydraulic drives are implemented.

Thus, an electrically driven test bench or testing station may be provided for improving the reliability of a vehicle safety test. By taking this measure, a controlled or regulated velocity pattern may be achieved without the necessity to define a test matrix or to perform comparison tests. The test and the results may be more precise and may be essentially independent of the environmental temperature. It may be possible to make the test procedure faster and to reduce the times required for changeover or recalibration of the system. The operation safety may be very high and the operation may be user-convenient and may involve only a very small effort for maintenance.

Next, further exemplary embodiments of the device will be explained. However, these embodiments also apply to the method, to the program element and to the computer-readable medium.

The device may be adapted so that the mounting unit and the test body mounted thereon are mechanically driven exclusively by the electric drive unit. In other words, a purely electric drive mechanism may be implemented. No non-electric drive mechanism are implemented in such an embodiment. The entire drive energy or drive power for moving the mounting unit may be provided by the electric drive mechanism in such an embodiment. In such an embodiment, the drive mechanism may be free of any non-electric drive components, particularly may be free of any pneumatic drive component. The mechanical drive mechanism for mechanically driving the mounting unit and the test body mounted thereon may consist of an electric drive unit. By such a measure, it may be dispensible to implement complex and expensive pneumatic drive systems. In an embodiment, all energy required for a coarse and a fine control of a sequence of phases with different acceleration characteristics may be provided by an electric drive unit which may have one or more linear motors.

The mounting unit may be adapted for mounting at least one test body of the group consisting of a test body simulating a human head, a test body simulating a head of an adult, a test body simulating a head of a child, a test body simulating a hip of a human, a test body simulating a leg of a human, and a set of test bodies simulating different body portions of a human. The mounting unit may be adapted for mounting a test body which may be a test body simulating a head of an adult, a test body simulating a head of a child, a test body simulating a hip of a human, and/or a test body simulating a leg (for instance a leg) of a human. For this purpose, a specific provision may be taken at the mounting unit to allow to fasten or attach the corresponding test body thereto. One mounting unit may be adapted for mounting different test bodies so that one and the same test device may be used for testing with different test bodies, for instance five test bodies which may be required by legal provisions for approval of vehicles, namely three head simulating test bodies, one hip simulating test body and one leg simulating test body.

The device may comprising at least one test body of the group consisting of a test body simulating a human head, a test body simulating a head of an adult, a test body simulating a head of a child, a test body simulating a hip of a human, a test body simulating a leg of a human, and a set of test bodies simulating different body portions of a human. The device may further comprise one or more of the previously mentioned test bodies which may be specifically adapted to correspond to respective fastening provisions at the mounting unit for mounting the test body. The mounting of a test body at the mounting unit may be so that upon exertion of forces below a threshold value, the test body follows the motion of the mounting unit. When the threshold force is exceeded, the test body may be however released from the mounting unit so that the test body moves towards the physical structure such as a vehicle under examination. Such a sudden force impact may be initiated by a sudden deceleration of the mounting unit which may be realized by a braking operation of the electric motor or by an obstacle or a barrier in the motion direction of the mounting unit which stops the motion of the mounting unit upon collision therewith.

Alternatively, it is also possible that the mounting unit and the test body are firmly fixed to one another during the acceleration phase. Release of the test body from the mounting unit may then be triggered by a specific mechanical or electric signal. For instance, such a signal may generate an electric or magnetic force which has the impact that the previously fixed connection between mounting unit and test unit is released. Alternatively, such a signal may generate or remove a mechanical force which has the impact that the previously fixed connection between mounting unit and test unit is released. Such a mechanical force may be a force which removes a previous locking or engagement between mounting unit and test body.

The mounting unit may be adapted for substitutably mounting different test bodies. The mounting unit may be adapted for substitutably/detachably mounting different test bodies. Thus, a kit or construction set may be provided comprising different test bodies and one mounting unit which is configured for mounting each individual one of the test bodies, one at a time. Therefore, different tests may be carried out one after the other with the different test bodies using the same mounting unit. It is also possible to provide a plurality of mounting units adjusted to different ones of the test bodies.

The electric drive unit may comprise an electric linear motor. A linear motor may be a multiphase alternating current (AC) electric motor that has had its stator "unrolled" so that instead of producing a torque (rotation), it produces a linear force along its length. One mode of operation is a Lorenz type actuator in which the applied force is linearly proportional to the current and the magnetic field. Such a linear motor, for instance a high acceleration linear motor, may be relatively short and may be designed to accelerate an object up to a high speed and then release the object. When implementing an electric linear motor in the collision simulation device, a high accuracy may be achieved.

The control unit may be adapted for controlling the electric drive unit to accelerate the test body in accordance with a predefined velocity profile and/or acceleration profile. The control unit may be adapted for controlling the electric drive unit to accelerate the test body in accordance with a predefined velocity profile (or in accordance with a predefined acceleration profile). A large variety of different velocity profiles may be defined by a user so as to allow to operate the device in accordance with user preferences.

Particularly, the control unit may be adapted for controlling the electric drive unit to accelerate the test body in accordance with a predefined trapezoidal velocity profile (which may have a slowly rising edge followed by a plateau followed by a fast falling edge). Such a profile is shown, for instance, in FIG. 2. A trapezoidal velocity profile may start with a linearly increasing velocity, followed by a plateau in which the velocity is constant over time, then followed by a linear reduction of the velocity which may have a slope being higher than the slope in the rising part of the trapezoidal velocity profile. Such a profile may allow for a proper acceleration scheme to define accurate conditions when the test body leaves the mounting unit.

The control unit may be adapted for controlling the electric drive unit to shoot the accelerated test body towards the physical structure for collision. Thus, when the test body is released from the mounting unit, the test body may freely move in space only under the influence of forces of gravitation starting with the predefined velocity, to thereby fly towards the collision partner, namely the physical structure, in accordance with a specific angle (which may be an angle between a force vector of the test body at the time of collision and a surface portion of the physical structure at the position of collision).

The control unit may be adapted for controlling the electric drive unit to direct the accelerated test body towards the physical structure under an adjustable angle. Therefore, it is not necessarily the case that the control unit releases the test body in a horizontal direction, but any inclined angle with regard to a horizontal direction may be adjusted in the device to increase the degree of freedom regarding tests carried out.

The device may comprise a stator or support on which the mounting unit is movable along a predefined trajectory. Such a support may be a table or any other substrate which may be assembled statically in an essentially vibration-free manner and which defines a (for instance linear) trajectory along which the accelerated mounting unit is moved.

Particularly, the support may comprise a guide rail along which the mounting unit may be movable to follow the predefined trajectory. Thus, the mounting unit may be guided in a slidable manner along the guide rail which thereby defines the motion direction very accurately.

The device may comprise a measurement unit adapted for measuring data indicative of a motion of the test body mounted on the mounting unit and for supplying the measurement data to the control unit as a basis for controlling the electric drive unit. Particularly, the measurement unit may perform a longimetry measurement of the test body mounted on the mounting unit. When corresponding data sets (parameter pairs of time and position) are reported to the control unit, the control unit may verify or monitor whether the present motion characteristic is appropriate or whether a modification of the regulation is necessary.

The device may comprise an analysis unit adapted for detecting and evaluating collision data indicative of a collision between the test body and the physical structure. Such an analysis unit may comprise a camera for capturing images or a video of the collision for subsequent evaluation. It is further possible that such an analysis unit comprises one or more sensors positioned at or in the test body and/or in the physical structure which allows to measure parameters characterizing the collision. Such an evaluation or analysis unit may be incorporated in the device so as to provide an integrated solution for a crash simulation system.

The electric drive unit may comprise a plurality of electric linear motors to be operated parallel (timely and/or spatially) to one another and in a synchronized manner. It has been surprisingly recognized that, for specific high power shooting experiments, it might be insufficient to use only a single electric linear motor to obtain the required high power values. Therefore, it is possible to provide a multitude of electric linear motors, for example three, four or more, the operation of which are to be synchronized so as to obtain a sufficiently powerful acceleration of the test body. Particularly, the acceleration force provided by such an electric drive unit may be at least 1000 N, particularly may be at least 1500 N, more particularly may be at least 2000 N. A force of such a magnitude may be provided by a plurality of linear motors together. Particularly, a software routine for controlling the electric linear motors may be particularly specified so as to synchronize properly the acceleration contributions of the individual linear motors. Such a software routine may be configured to enable a switching of the individual linear motors parallel in time. The linear motors may be connected in series. In contrast to conventional approaches, the entire acceleration power or energy may be provided by the electric drive unit according to an exemplary embodiment of the invention.

In an embodiment, the control unit may be adapted for controlling the electric drive unit to accelerate the test body during a first time interval, to regulate a constant velocity of the test body during a second time interval succeeding the first time interval, and to decelerate the test body during a third time interval succeeding the second time interval. During the first time interval, the velocity of the test body may be increased, during the second time interval the velocity of the test body may be maintained at a desired target value, and during the third time interval, a negative acceleration may be impacted on the test body to thereby brake the mounting unit so that the test body can be released from the mounting unit.

In an embodiment, the device may be adapted so that, exclusively by the electric drive unit, the mounting unit and the test body mounted thereon are accelerated during the first time interval, moved with the constant velocity during the second time interval and decelerated during the third time interval. Therefore, all three cycles of an acceleration-forceless operation-deceleration sequence may be powered only by the electric drive unit alone which therefore acts as the only power supply for adjusting velocity of mounting unit/test body. In an embodiment, exclusively linear motors are employed for accelerating (a>0), regulating the velocity and decelerating (a<0). No pneumatic and hydraulic components are necessary in such embodiments.

The mounting unit may comprise a first fastening member (such as a recess or a protrusion) adapted for being engaged with a cooperating second fastening member (such as a protrusion or a recess) of the test body for mounting the test body on the mounting unit.

More specifically, the mounting unit may comprise a recess for receiving a protrusion (such as a pin) of the test body for mounting the test body on the mounting unit. Therefore, an accommodation space may be formed in the mounting unit which is configured for receiving a protrusion of the test body which may be shaped and dimensioned in accordance with the recess. For assembling, the test body may be simply plugged on the mounting unit using cooperating fastening elements provided at mounting unit and test body.

In an embodiment, the test body may form part of the device.

In an embodiment in which the mounting unit has a recess and the test body has a pin, the mounting unit may comprise a magnetic field generating unit (which may be located around the recess) for generating a magnetic field in and optionally around the recess. The protrusion of the test body may comprise a magnetic material (for instance a permanent magnet) which may be attracted by means of an attracting magnetic force provided by the magnetic field generating unit. It may be preferred that the magnetic field generating unit is an electromagnet which may controllably and selectively generate a magnetic field only upon powering the electromagnet. Thus, for maintaining the test body attached to the mounting unit, the attracting magnetic force may be switched on.

Still referring to the above embodiment, the control unit may be adapted for activating the magnetic field generating unit for generating the magnetic field resulting in the attracting magnetic force in the recess before (and/or during) accelerating the test body mounted on the mounting unit. The magnetic field generating unit may be deactivated for switching off the attracting magnetic field when accelerating and/or releasing the test body from the mounting unit. For instance, the magnetic field may be switched on when the mounting unit and the test body rest at the device, whereas the magnetic field may be switched off when the mounting unit and the test body move relative to a stator of the device. Therefore, the control unit may for example send an electric activation current to the electromagnet so as to generate a magnetic field which attracts the pin (which can be made of a ferromagnetic material such as iron, nickel or cobalt or the like). Hence, before carrying out the experiment and/or during the acceleration phase at which the test body is to be mounted fixedly on the mounting unit, the magnetic field supports the stable configuration. At the latest at the moment at which the test body is released from the mounting unit, such a magnetic field may be switched off because the maintenance of such a magnetic field would reduce the velocity of the test body when leaving the mounting unit. In order to further promote the release of the test body from the mounting unit, it is even possible that the magnetic field generated by the magnetic field generating unit changes sign at the moment of releasing the test body, so that a repelling magnetic force is generated for promoting release of the test body from the mounting unit.

The mounting force holding the test body on the mounting unit (before the release) may be exclusively accomplished by a form closure of the recess with the pin in combination with the magnetic field attracting the magnetic pin of the test body. Hence, no further force components in addition to the positive locking between pin and recess (or any other two cooperating fastening elements) in combination with the attracting magnetic force may be sufficient for a mechanically stable configuration.

In an embodiment, a counterweight may be provided at the device which may be configured to be mechanically driven (for instance only) upon mechanically driving the mounting unit and the test body mounted thereon along a moving direction being oppositely oriented with regard to the moving direction of the mounting unit and the test body mounted thereon. In other words, the counterweight may compensate mechanical forces acting on the device upon accelerating mounting unit and test body along one direction. When moving the counterweight in an opposite direction, a balancing of such forces on the device may be achieved so that the device can be operated smoothly. Such a counterweight is particularly advantageous when the mounting unit and the test body are arranged at a lateral side surface of the device. In such a scenario, it may be advantageous to arrange the counterweight at an opposing side surface of the device. When the mounting unit moves in a forward direction, the balance weight would move in a backward direction, and vice versa. In other words, a motion of both the mounting unit and the counterweight may be executed along a longitudinal extension of the (for instance oblong) device. Projected on this longitudinal axis, the mounting unit may move from a first position (starting position of the mounting unit) to a second position (destination position of the mounting unit), whereas the counterweight may move simultaneously from the second position (starting position of the counterweight) to the first position (destination position of the counterweight). With such a configuration, a spatially compact device may be obtained which can be operated without disturbing shaking or oscillating due to uncompensated forces.

A mass of the counterweight may equal or may be identical to a mass of the test body (considering the mass of the mounting unit). In other words, the counterweight may be configured to have a mass which balances out mechanical loads acting on the device as a consequence of the moving test unit/mounting unit.

The device may comprise a force converter mechanically coupling the counterweight with the mounting unit and the test body mounted thereon so that the force converter converts a force acting on the mounting unit and the test body mounted thereon to a converted force acting on the counterweight. Due to a corresponding motion coupling of the mounting unit and the counterweight, it is possible to move both the mounting unit and the counterweight by one and the same drive, i.e. by the electric drive unit. Therefore, it may be dispensable to use any additional drive for driving the counterweight. This allows for a compact device, and also eliminates any synchronizing effort for synchronizing motion of the counterweight and the mounting unit, because this is achieved automatically.

Particularly, the force converter may comprise a cable pull mechanism having a cable connecting the counterweight with a mounting unit to reverse a force vector acting on the mounting unit and the test body mounted thereon into an inverse force vector acting on the counterweight. Such a cable pull mechanism is a very simple mechanism for inverting the direction of a force and allows for a compact construction of the device together with a very reliable force transformation.

The stator of the device carrying the guide rail on which the mounting unit can move may further comprise a further guide rail on which the counterweight is movable along a predefined further trajectory. The two guide rails may be parallel to one another and the two trajectories may be antiparallel to one another, and spatially displaced by a distance equalling to the transversal dimension of the stator. Such a configuration allows for a safe guide mechanism for guiding both the counterweight and the mounting unit so as to properly compensate any forces.

Moreover, the device may comprise a robot mounting base adapted for mounting a robot for spatially moving the device. In other words, an adaptor may be provided such as a flange at which a robot may be mounted with the device. Mounting the device on the robot may be advantageous since the robot may move the device freely in space to a destination position at which a shooting experiment is to be carried out. However, such robots are very prone to failure when a component mounted thereon tends to oscillate or exerts uncompensated forces on the robot. Therefore, the configuration with the robot mounting base is particularly advantageous in combination with the provision of a counterweight which can ensure that a force free acceleration experiment is carried out without a disturbing impact on a robot assembled with the device. This allows for a proper spatial resolution of an experiment and allows to use even simple robots thereby reducing costs.

The device may comprise a user interface for enabling a user to communicate with the device. The device may comprise a user interface for enabling a user to bidirectionally communicate with the device. Thus, the user may supply the device via the user interface with control demands via input elements such as a keypad, a joystick, or the like. Furthermore, results of the investigation may be displayed to a user on a display unit of the user interface, for instance a liquid crystal display (LCD) unit or the like.

Particularly, embodiments of the invention may be advantageously applied in the context of the simulation of a crash of the physical structure, for instance a crash of a vehicle, like an automobile, with a pedestrian or its occupant.

Another field of application of exemplary embodiments of the invention is a simulation or test of integrity of operation of the physical structure. More generally, embodiments of the invention may be applied to any material test in structural mechanics. Results from the crash test may be analyzed under consideration of finite element (FE) calculations which may deliver complementary information.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 5 shows a relative orientation and motion of different test bodies relative to a physical structure of a collision test.

FIG. 6 shows a collision between a car and a crash test dummy.

DESCRIPTION OF EMBODIMENTS

Figure 1:
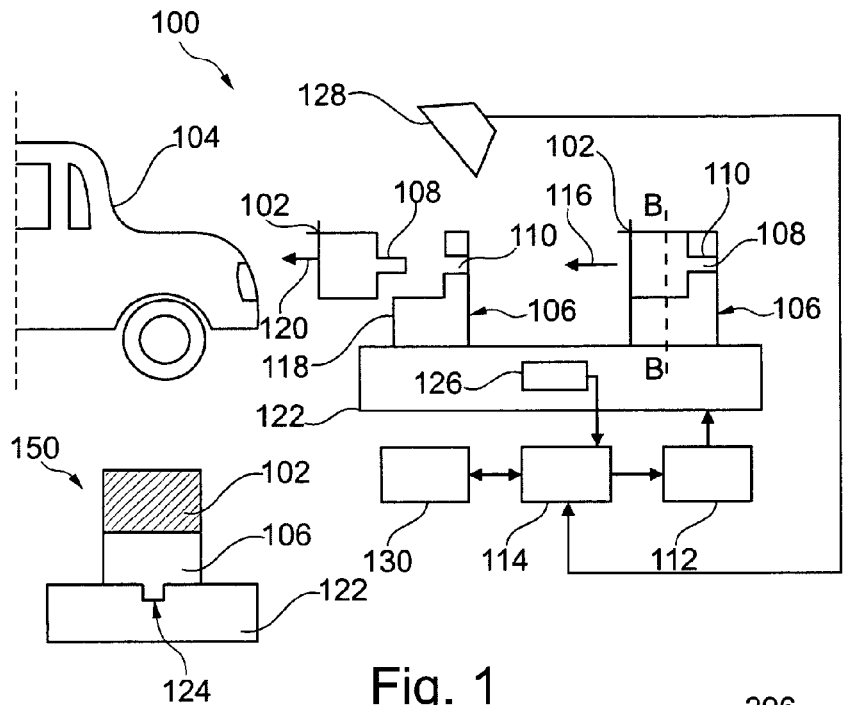
FIG. 1 illustrates a device for investigating a collision between a body part impactor and a car according to an exemplary embodiment of the invention.

The illustration in the drawing is schematically.

In the following, referring to FIG. 1, a device 100 for simulating a collision between a test body 102 and a physical structure 104 according to an exemplary embodiment of the invention will be described.

The test body 102 simulates a body portion of a human being, whereas the physical structure 104 is a vehicle which shall be tested and possibly approved when determined safety characteristics meet specific criteria.

The device 100 comprises a mounting unit 106 for mounting the test body 102. Particularly, a protrusion 108 of the test body 102 is shaped and dimensioned to fit to a recess 110 of the mounting unit 102.

A linear electric motor 112 is provided and directly coupled electrically with the mounting unit 106 for mechanically driving the mounting unit 106 and the test body 102 mounted thereon.

A control unit 114 (which can be a central processing unit, CPU, or a microprocessor) is provided and is adapted for controlling the linear electric motor 112 to accelerate the test body 102 mounted on the mounting unit 106 in accordance with a desired motion pattern and for controlling release of the test body 102 from the mounting unit 106 at a predefined spatial position to move the accelerated test body 102 towards the physical structure 104 for collision.

FIG. 1 shows, in solid lines, the test body 102 in an operation mode in which it is fastened or assembled at the mounting unit 106. In dotted or dashed lines, FIG. 1 shows the test body 102 after being released from the mounting unit 106. This may be initiated by suddenly stopping the moving mounting unit 106 (see arrow 116 indicating a motion direction) at a position at which the mounting unit 106 intentionally collides with a spatially fixed block 118. At this point of time, the mounting unit 106 is suddenly stopped and, under the influence of inertia, the test body 102 continues its motion towards the vehicle 104 (see arrow 120).

The test body 102 may be a test body for simulating a head of an adult or of a child, a test body simulating a hip of a human, a test body simulating a leg of a human or any other test body.

The mounting unit 106 is adapted for substitutably or detachably mounting different test bodies 102.

The control unit 114 is adapted for controlling the linear drive motor 112 to accelerate the test body 102 in accordance with a predefined trapezoidal velocity profile as the one shown in FIG. 2 which will be described below in more detail.

After the mounting unit 106 has been stopped by the block 118, the test body 102 is shot towards the physical structure 104 for performing a defined collision regarding velocity, collision position and collision angle.

The mounting unit 106 is mounted on a support 122 (which may also be denoted as a stator, since it remains spatially fixed) which comprises a guide rail 124 along which the mounting unit 106 is movable along a predefined trajectory. This can be taken from a cross-sectional view 150 along a line B-B' shown in FIG. 1.

A measurement unit 126 adapted to perform a longimetry measurement of the test body 102 mounted on the mounting unit 106 is provided for measuring data indicative of a motion of the test body 102 mounted on the mounting unit 106 and for supplying the measurement data to the control unit 114 as a basis for controlling the linear drive motor 122.

Furthermore, a camera 128 (for instance a video camera, a CCD camera, a CMOS camera or the like) is provided for measuring or capturing data indicative of the collision between the flying test body 102 and the vehicle 104. Corresponding data may be supplied to the control unit 114 for evaluation. The control unit 114 may also have a capability of evaluating the collision data to calculate output data.

A user interface 130 is provided which is in bidirectional (or unidirectional) communication with the control unit 114 and which allows a user to define control commands for driving the device 100 and for receiving data indicative of a result of the investigation of the device 100.

Figure 7:
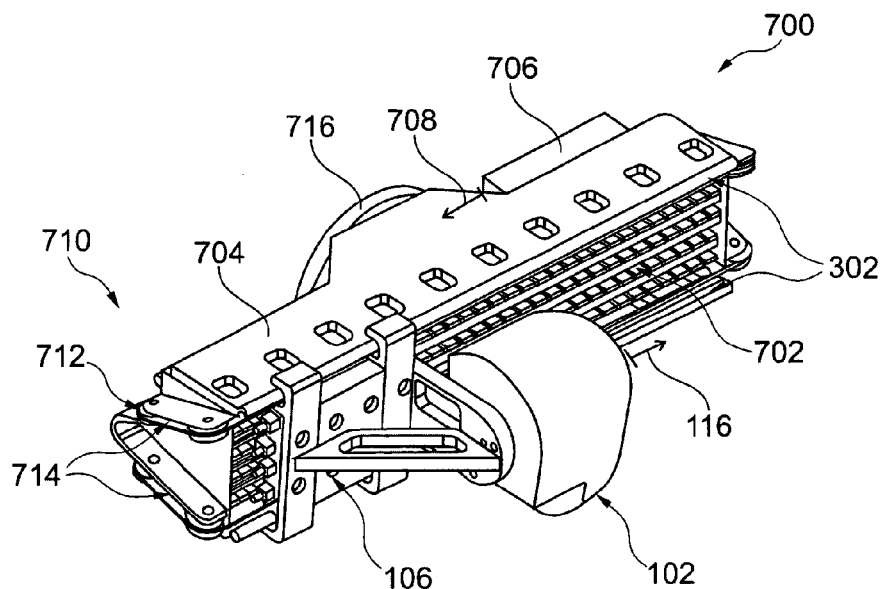
FIG. 7 and FIG. 8 show two three-dimensional views of a device for investigating a collision between a test body and a physical structure according to another exemplary embodiment of the invention.

It is noted that all aspects mentioned in the embodiment of FIG. 7 (particularly all aspects related to a counterweight and its operation, a magnetic attachment of the test body, the mounting on a robot, the configuration of an electric drive unit) can be implemented in the embodiment of FIG. 1 as well.

In the following, some basic recognitions of the present inventors will be explained based on which exemplary embodiments of the invention have been developed.

According to an exemplary embodiment of the invention, a device for performing vehicle component tests may be provided.

The European commission has issued a directive for safety of pedestrians. This directive has the goal to reduce the number of pedestrians killed or injured in traffic by performing modifications of the construction in the front region of vehicles. According to legal regulations, new types of vehicles will only be approved when having passed a number of pedestrian protection tests successfully. This may particularly include tests regarding an upper leg collision with a vehicle or the collision of a hip region with a front edge of the vehicle.

The US National Highway Traffic Safety Administration issues Federal Motor Vehicle Safety Standards (FMVSS) and Regulations to which manufacturers of motor vehicle and equipment items must conform and certify compliance. These Federal safety standards are regulations written in terms of minimum safety performance requirements for motor vehicles or items of motor vehicle equipment. These requirements are specified in such a manner "that the public is protected against unreasonable risk of crashes occurring as a result of the design, construction, or performance of motor vehicles and is also protected against unreasonable risk of death or injury in the event crashes do occur." Occupant protection is part of standards such as the FMVSS 201 (interior impact) and following standards. European standards and other national regulations for occupant protection are EG 74/60, ECE R21, (Japan).

According to an exemplary embodiment of the invention, a device for execution of crash tests for pedestrian protection and protection of occupants may be provided, particularly for simulating a collision of pedestrians or occupants with a vehicle structure. For carrying out such tests, specific test bodies may be shot onto the vehicle components. This may have the goal to shoot the test bodies with a sufficiently accurate velocity and spatial accuracy onto such components in order to obtain comparable and meaningful data allowing to decide whether a vehicle under test fulfils specific requirements.

In contrast to conventional apparatuses in which test bodies are accelerated using pneumatic or hydraulic cylinders for regulating the test velocity during the acceleration of the test body, exemplary embodiments of the invention implement linear electric motors which accelerate the test body in a controlled or regulated manner along a certain length to a corresponding test velocity. During the acceleration phase, the increase of the velocity may be continuously monitored by a length measurement system. The signal of the length measurement system can be detected by a software and can be evaluated. The software may supply, via a servo regulator, the linear electric motors with corresponding electricity. By taking this measure, it may be possible to carry out the acceleration of the test body in accordance with a definable trapezoidal motion profile, which can be adapted to the different tests.

Figure 2:
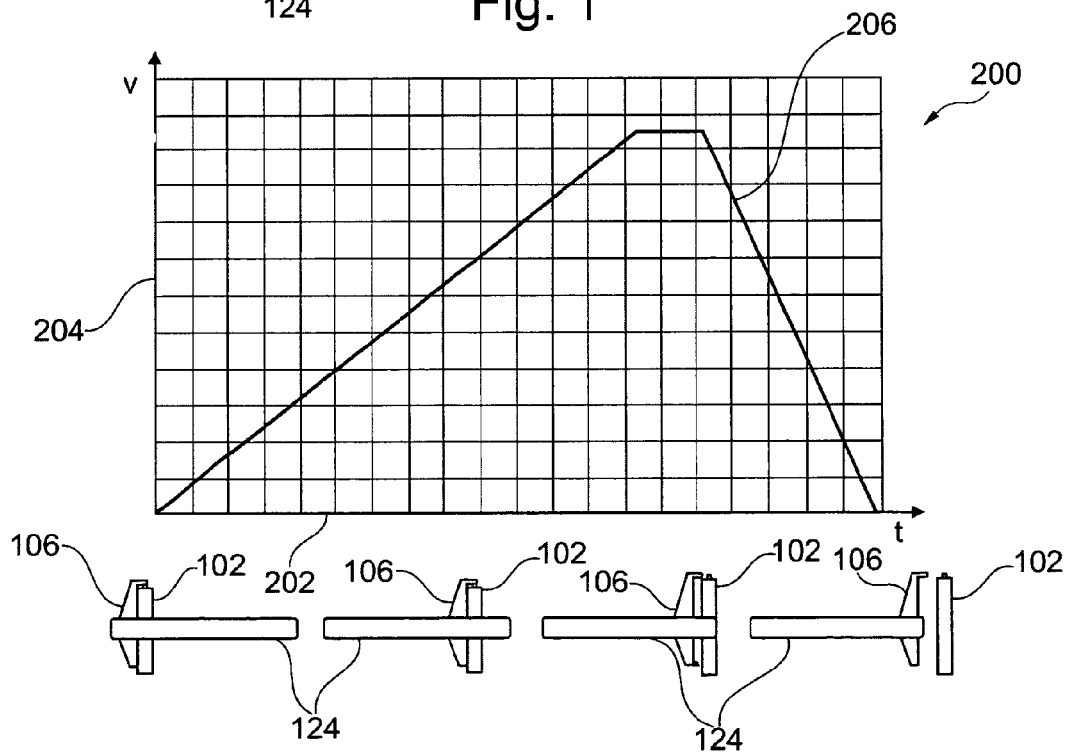
FIG. 2 shows a velocity profile of a mounting unit and a test body during operation of a device for investigating a collision between a test body and a physical structure according to an exemplary embodiment of the invention.

FIG. 2 shows a diagram 200 having an abscissa 202 along which the time is plotted. Along an ordinate 204, the velocity is plotted. A trapezoidal velocity profile is shown as a curve 206. The time axis 202 is correlated with different operation states of a device according to an exemplary embodiment of the invention, in which a mounting unit 106 is shown which is connected to a test body 102 which is, during a plateau phase of the curve 206, released from the mounting unit 106 when sliding along a guide rail 124.

One or more (electric) drive units may be mounted on a carrier which, in turn, by means of struts or bars, can be connected with an impact carrier in a certain distance.

Figure 3:
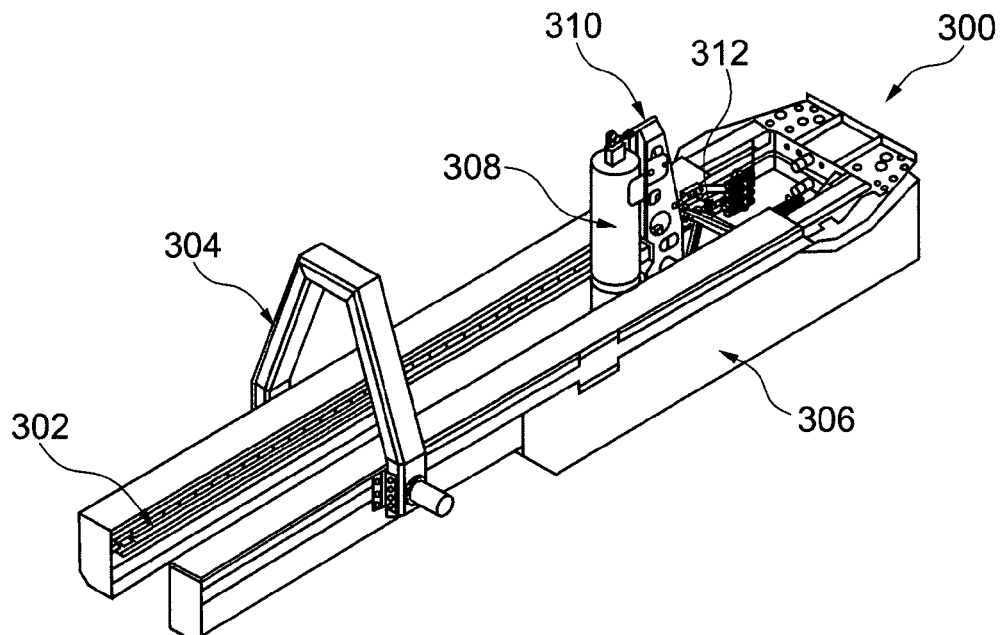
FIG. 3 illustrates a three-dimensional view of a device for investigating a collision between a test body and a physical structure according to an exemplary embodiment of the invention.

FIG. 3 shows a device 300 according to an exemplary embodiment of the invention showing a guide rail 302, a front connection member 304, a side cover or energy chain guide 306, a lower leg impactor 308, an impactor carrier 310 and a drive unit 312.

The shoot device 300 is provided on each side with precision guides 302. For the various test bodies 308, the launching unit 300 can be reassembled if desired fast and easily, by substituting the impact carrier 310 by another mounting unit.

Figure 4:
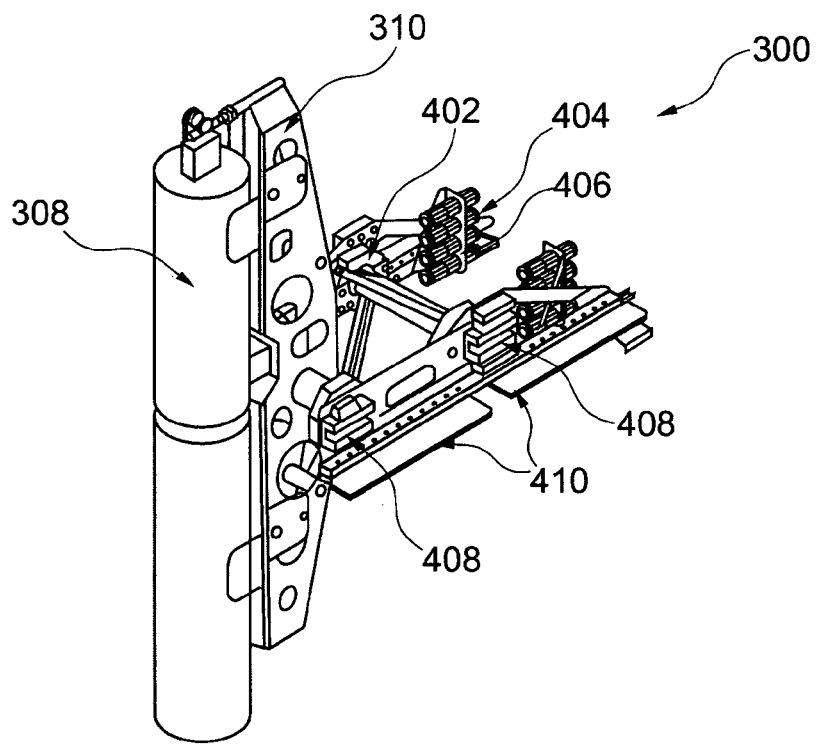
FIG. 4 is a detailed view of a portion of the device of FIG. 3.

FIG. 4 shows the device 300 in further detail.

FIG. 4 shows the impactor carrier 310 on which the lower leg impactor 308 or any other test body is mounted. An impactor clamp is denoted with reference numeral 402. Furthermore, plug connections 404 for sensor cables are shown as well as plug connections 406 for load current cables. A linear guide wagon 408 is shown as well as an ironless electric linear motor 410.

It is noted that all aspects mentioned in the embodiment of FIG. 7 (particularly all aspects related to a counterweight and its operation, a magnetic attachment of the test body, the mounting on a robot, the configuration of an electric drive unit) can be implemented in the embodiment of FIG. 3 and FIG. 4 as well.

FIG. 5 shows a test scenario 500 correlating the geometry of the car 104 with different test bodies, namely an adult head test body 502, a child head test body 504, a hip test body 506, and a leg test body 508. With a device 100 or 300 according to an exemplary embodiment of the invention, the respective test bodies 502, 504, 506, 508 can be directed with controlled velocity, impact angle and/or spatially relation to the car 104 to trigger a collision under precisely controlled conditions.

Such tests, as shown in FIG. 6, may simulate a collision between the car 104 and a crash test dummy or human 600.

In the following, some advantages will be mentioned which can be achieved with a device according to an exemplary embodiment of the invention.

One advantage is that such an apparatus is capable of adjusting the regulated velocity with which the electric drive accelerates the mounting unit with an accuracy of +/−0.05 km/h or more. In the field of pedestrian and occupant protection, tests with at least five different test bodies with dozens of different weights and angles may be required. This may require to define the desired velocity profile for each test, and the apparatus will then be regulated automatically. In contrast to this, in conventional apparatuses, a complex determination of the required velocity which is defined by a pressure generation has to be defined which is time consuming.

Furthermore, test matrix determination and calibration tests may be dispensable according to exemplary embodiments of the invention. Conventional test apparatuses are operated pneumatically or hydraulically. The desired test velocities must therefore be determined on the basis of a test matrix and calibration tests. Such a test matrix may be a table constructed based on tests which describe the correlation between desired velocity, test body, test mass and test angle.

Five test bodies required for specific test sequences each represent a human body part (three heads, one hip, one leg). The three heads may have different masses and/or dimensions and may be accelerated to 35 km/h or 40 km/h with different test angles (for instance in a range between 50° and) 65°. The velocity, the mass and the test angle of a hip impactor may result from the construction of the vehicle to be tested. Thus, the device front may be measured in accordance with a test procedure, and test data are evaluated therefrom.

The test mass may be in a range between 9 kg and 14 kg, and the velocity may be in a range between 16 km/h and 40 km/h, wherein the test angle may vary between 20° and 60°. The leg form can be shot with different angles (for instance 0° to 6°) and with a velocity of 40 km/h to the vehicle front to be examined. Furthermore, the temperature in the examination space and the humidity in the examination space may have to be taken into account. According to legal provisions, the tests should be carried out in a range between 18° C. and 26° C. and at between 10% and 70% humidity. The different temperatures and humidity values may result conventionally from different filling properties of a pressure container and correspondingly different test velocities. Thus, these two components also have to be implemented in the test matrix in a conventional system. This may result in a plurality of different test constellations which have to be carried out after operation and maintenance of the acceleration device. This may require between the performance of 400 to 700 tests.

Calibration tests may be tests which are required in order to test the respective shot device. In this context, one or more tests on a collision rack or stand have to be carried out in order to test the matrix and, if necessary, to correct it. This may also ensure to achieve the desired velocity in an accepted field of tolerances.

Erroneous tests (tests out of a range of acceptable velocities, hits apart from the field of tolerance) should be prevented since they are very expensive due to high efforts required for preparing the vehicle and the test bodies. Furthermore, due to the implantation of finite element simulations in the field of pedestrian and occupant protection development it has become even more important to provide a very good agreement with the test parameters. This also includes that the velocity tolerances have to be considered.

Furthermore, exemplary embodiments of the invention allow to perform more precise tests and to achieve more precise results. While the development of pneumatic and hydraulic apparatuses is more or less unchanged, finite element simulation in automotive development has become so important that many tests are only carried out in order to confirm simulation results. For this purpose, it is required to have very precise testing conditions yielding results which are properly comparable with FE data. At the regulated velocity, a sensor verifies in frequencies whether the velocity is correct, as long as the test body is in acceleration. In conventional apparatuses, a pressure can be generated up to a value determined by a test matrix, and the test body may be shot from a shot device. At the point of time of the shot, no regulating management is possible any longer. The user has to rely upon the fact that the velocity has been correct.

Furthermore, exemplary embodiments of the invention do not show a strong dependency of the room temperature which is a problem with conventional apparatuses in which, for instance, sealings and operation fluid have to adjusted to a respective velocity.

Conventional test systems are very sensitive regarding temperature and humidity in the test environment. However, according to exemplary embodiments of the invention, such a temperature dependence is efficiently suppressed, since the velocity is regulated in real time using an electric drive unit.

Furthermore, it may be possible to carry out the tests in a faster manner. The electric drive may be particularly advantageously in this respect, because when the test body carrier drives back immediately after the end of the tests into the initial position, no time consuming piston back drive procedures are required which conventionally has to be carried out manually. Such a conventional need for a manual back transportation is also a source of danger and injury because a user has to be located directly in a shot region of the apparatus.

Moreover, the electric drive provides the opportunity at each time to position the launch device with a precision of millimeters and less, for instance in order to capture a test body or to detect a target (test body hit point) at the device under examination with high precision.

Furthermore, a waiting time for generating a pressure is eliminated, which is required at conventional hydraulic or pneumatic cylinders. This may allow to safe up to 15 minutes or more per test. This may correspond with a reduction of the time of a complete test of 15% or more.

Moreover, reassembling can be performed with low effort in a fast time. The five test bodies which are frequently used for pedestrian and occupant protection tests can be mounted using different launch units (or mounting units) to be assembled and disassembled on the apparatus. In such a conventional case, the shot devices cannot be mounted by one person alone, and the time consumption for the reassembly may be in the order of magnitude between 1 hour and 8 hours. In contrast to this, embodiments of the invention are designed in such a manner that there is only one shot device and there are only three carriers for the test bodies which can be exchanged in an easy manner because they have to be only fastened with a number of (for instance 8) screws or any other fastening elements. The time for reassembly may be 15 minutes or less.

Beyond this, a high degree of security for operating a device according to an exemplary embodiment of the invention may be achieved. Pneumatic and hydraulic apparatuses work with different pressure containers with work pressures between 2 bar and 11 bar. The pressure containers are a source of danger, and thus the security provisions during and after the test have to be strict. Such a risk does not occur according to exemplary embodiments of the invention.

Furthermore, exemplary embodiments of the invention may be operated in an easy manner. The operation of pneumatic and hydraulic apparatuses requires high skill of users. According to an exemplary embodiment of the invention, a large amount of such knowledge is no longer required for managing or handling the apparatus. The control of the device can be performed via menus (supported with images, videos and/or error analysis). Furthermore, a full automatic capturing and evaluating of test data may be integrated in the device.

Moreover, the maintenance efforts may be very small. Due to the low-friction or frictionless drive, the high effort when changing cylinder pistons and sealing rings may be eliminated.

Since the device according to an exemplary embodiment of the invention can be operated immediately and provides reliable test results, a high performance can be combined with a short waiting time between different ones of a sequence of tests. The operation of the device can be performed by one person, regarding tests and reassembly. Thus, the skills and man power required for operating the device are relatively low. Moreover, expensive work media such as nitrogen or hydraulic oil can be avoided.

FIG. 7 shows a device 700 for investigating a collision between a test body 102, in the present example a test body simulating a head of a human being, and a physical structure (not shown) according to another exemplary embodiment.

Also in this embodiment, the mounting unit 106 and the test body 102 are exclusively driven by an electric drive unit which is realized by a plurality of linear motors, for instance by four linear motors in the described embodiment. Reference numeral 702 shows the secondary portions of the linear motors. The four electric linear motors are operated parallel to one another in a synchronized manner. For this reason, a control unit (not shown in FIG. 7) controls the four linear motors based on a software routine so as to synchronize their operation in time. In other words, the four linear motors are operated to be switched parallel in time. The four linear motors are connected in series to one another. The provision of four linear motors results from the fact that for the acceleration of heavy objects, the use of for instance only one or two linear motor may not be sufficient when pneumatic or hydraulic acceleration systems shall be completely omitted, as in the embodiment shown in FIG. 7 and FIG. 8. Therefore, the described embodiment of the invention overcome the prejudice in the pertinent technical field in which the artisans considered it to be impossible to operate such a shooting device only on the basis of linear motors, without using hydraulic or pneumatic acceleration systems, and nevertheless to obtain the required velocities and forces. However, an arrangement with multiple parallel linear motors as shown in FIG. 7 has solved this long-lasting problem in the art in a very compact manner. For instance, it is possible to manufacture the device of FIG. 7 with a length (in a direction 116) of about 700 mm or less, and dimensions in directions perpendicularly to this direction 116 of for instance 200 mm×200 mm or less.

Figure 12:
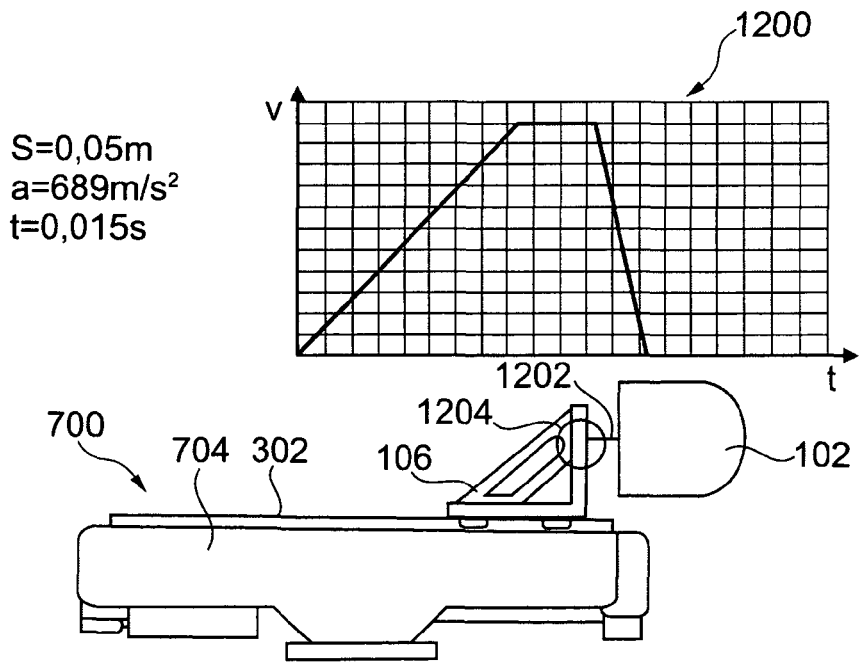

As best shown in FIG. 12, the test body 102 comprises a protrusion or pin 1202 made of a magnetic material which is shaped and dimensioned to correspond to a recess (compare reference numeral 1204) in the mounting unit 106 so that this recess may engage with the protrusion 1202 for holding the test body 102 on the mounting unit 106.

Figure 8:
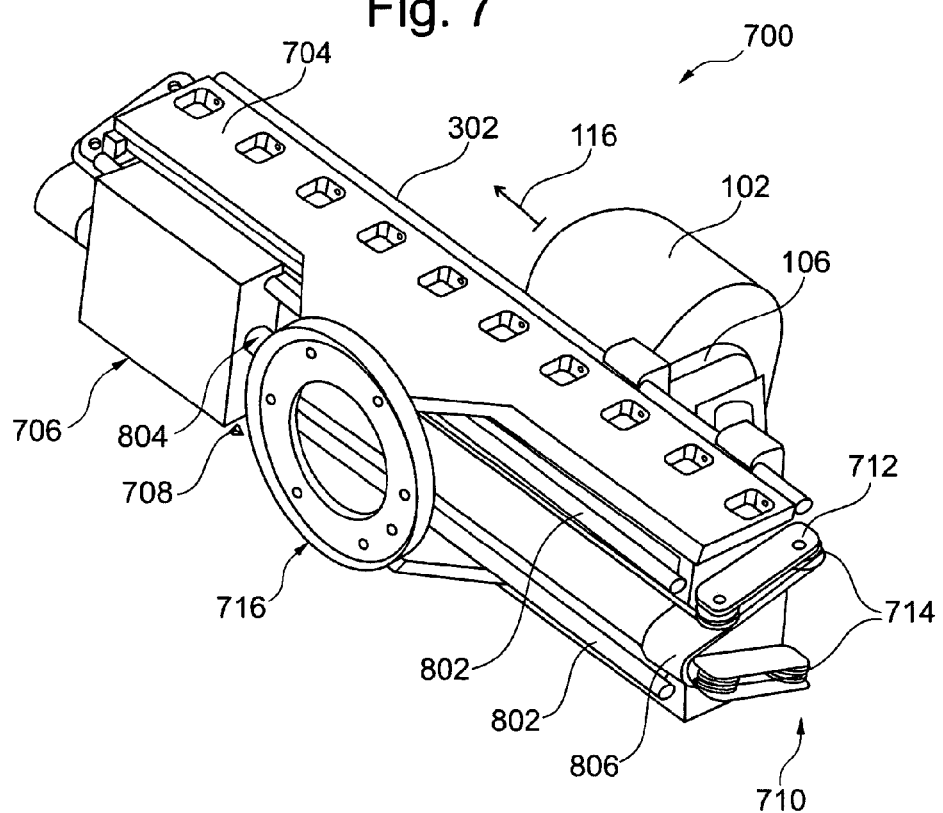

Additionally, although not shown in FIG. 7 and FIG. 8, the mounting unit 106 has incorporated an electromagnet for generating a magnetic field around the recess for receiving the protrusion 1202, so that the test body 102 may be fastened at the mounting unit 106 not only by the form closure between protrusion 1202 and recess, but also by an attracting magnetic force. The control unit (not shown in FIG. 7) may be adapted for activating the electromagnet for generating the magnetic field resulting in the attracting magnetic force in the recess before accelerating the test body 102 mounted on the mounting unit 106. The control unit may be further adapted for deactivating the electromagnet for switching off the attracting magnetic field when the test body 102 is to be accelerated by the mounting unit 106. Alternatively, it is also possible to maintain the magnetic force during the acceleration phase and to switch off the magnetic field only upon release of the test body 102 from the mounting unit 106.

As can be taken from FIG. 7, the mounting unit 106 is mounted via the guide rails 302 on a support 704 of the device 700. On an opposite side surface of the support 704, as better shown in FIG. 8, a counterweight 706 is mounted which is configured to be mechanically driven upon mechanically driving the mounting unit 106 and the test body 102 mounted thereon along a moving direction 708 which is oppositely oriented with regard to a moving direction 116 of the mounting unit 106 and the test body 102 mounted thereon.

A mass of the counterweight 706 is adjusted to a mass of the test body 102 (in combination with the mounting unit 106) to therefore at least partially equilibrate or balance out forces acting on the support 704 upon accelerating the test body 102 along the direction 116. Therefore, a nearly force-free acceleration may be achieved by the balance mass 706.

A cable pull mechanism 710 is provided as well which comprises a cable inversion member 712 as well as hauling ropes 714. The ropes or cables 714 connect the counterweight 706 with the mounting unit 106 to reverse a force vector acting on the mounting unit 106 and the test body 102 mounted thereon to an inverse force vector acting on the counterweight 706. Therefore, it may be dispensable to provide a separate drive unit for driving the countermass 706, so that also the countermass 706 is indirectly driven by the electric linear motor.

As can be taken best from FIG. 8, a further guide rail 802 is provided for guiding the balance mass 706 along the direction 708.

Furthermore, a robot mounting base 716 is provided as a flange at which a robot (not shown in figures) is to be mounted. The mounting of a very simple robot is possible according to an exemplary embodiment, since the provision of the balance weight 706 allows for a force-free operation of the device 700, so that no disturbing forces are exerted on the robot during the acceleration experiment.

A damper or shock absorber 804 is provided at the counterweight 706 to absorb mechanical forces when the balance mass 706 abuts against a front member 806 of the device 700.

After releasing the test body 102 from the mounting unit 106 the test body 102 is in free flight for about 40 mm before interacting with the collision body (not shown).

Although the embodiment of FIG. 7 and FIG. 8 is configured for head collision experiments in an occupant compartment of a vehicle, a similar configuration is possible with an embodiment as shown in FIG. 1, for instance.

Still referring to the embodiment of FIG. 7 and FIG. 8, the use of linear motors allows for a recoilless acceleration due to the motion of the counterweight 706 in the acceleration phase. Consequently, it is possible to use the device 700 in combination with a robot being sensitive regarding vibrations, for instance a six axes robot, thereby allowing for a precise and simple positioning of the device 700 without the danger of deteriorating operation of such a robot.

In order to meet legal requirements regarding passive vehicle safety (see US directive FMVSS 201, European directive ECE R21, etc.) collision experiments have to be performed in an occupant cell of a vehicle in order to protect an occupant regarding injuries resulting from an collision of a head and components within a vehicle. Embodiments of the invention, particularly the embodiment of FIG. 7 and FIG. 8, may be used for such a purpose.

Referring to FIG. 9 to FIG. 12, a complete acceleration sequence will be described for the device 700 shown in FIG. 7.

Diagrams 900, 1000, 1100 and 1200 illustrate a relationship between time (abscissa) and velocity (ordinate) during the experiment.

Figure 9:
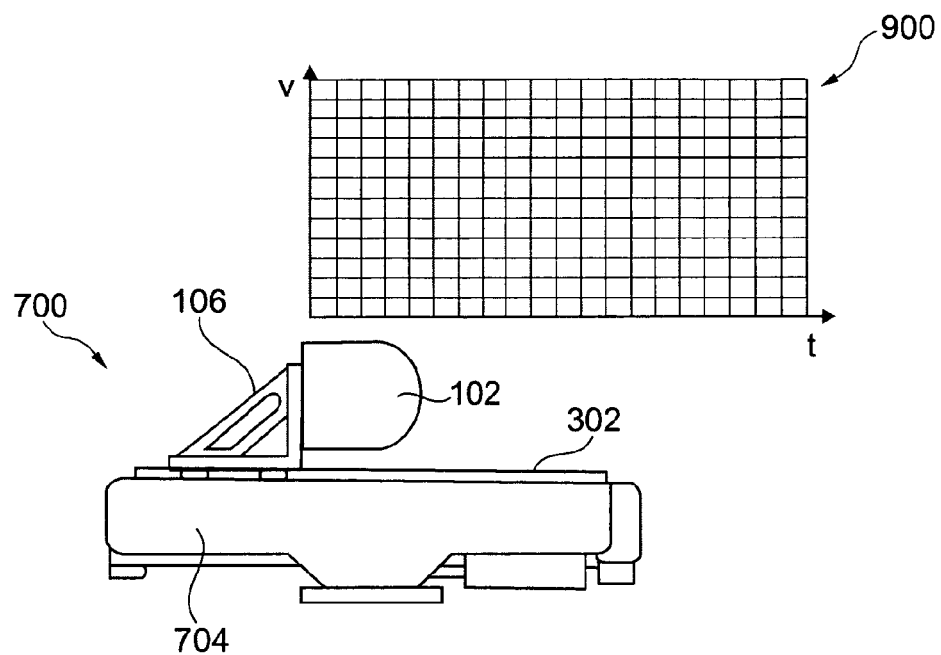
FIG. 9 to FIG. 12 show the device of FIG. 7 and FIG. 8 during four phases of a collision experiment.
Figure 10:
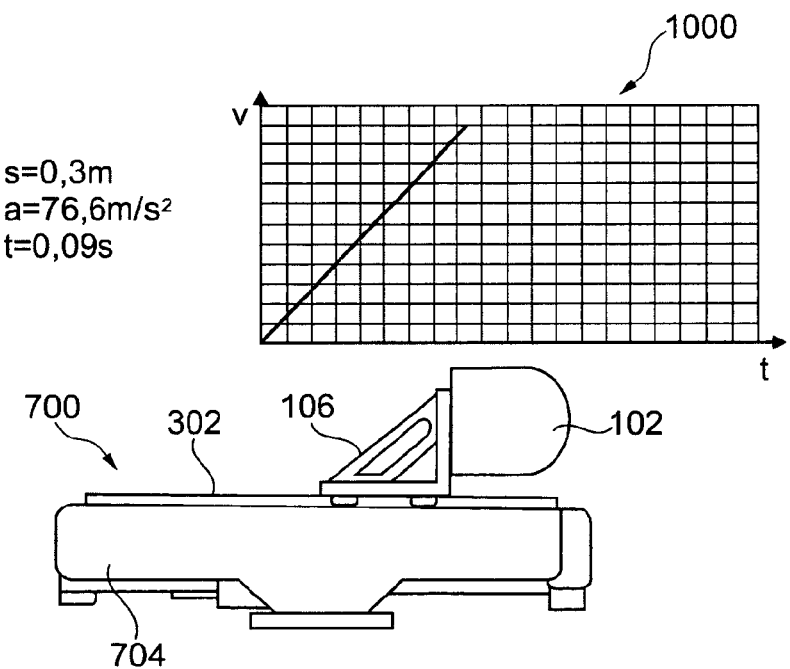
Figure 11:
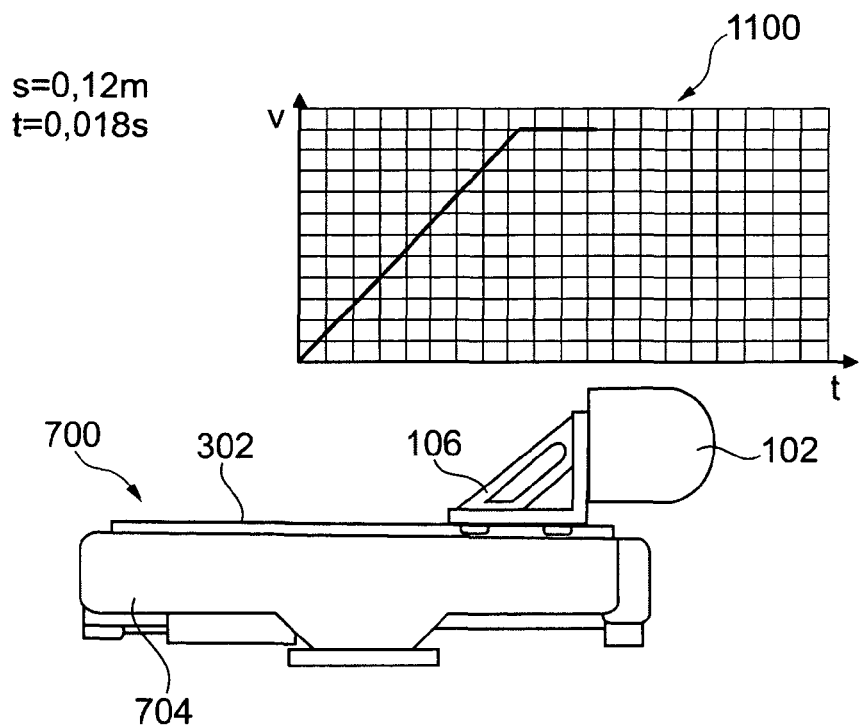

FIG. 9 shows a scenario before accelerating. FIG. 10 shows a scenario during acceleration, wherein a constant acceleration is applied to the test body 102. FIG. 11 shows a situation at which a constant velocity is maintained, and FIG. 12 shows the scenario of a deceleration during which the test body 102 is released from the mounting unit 106.

As shown in FIG. 12, the pin 1202 of the test body 102 is centered in a recess in the mounting unit 106 which is indicated schematically by reference numeral 1204 in FIG. 12. Around this recess, the electromagnet, for instance in the form of a coil powerable by electric current, can be arranged.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A device for investigating a collision between a test body and a physical structure, wherein the device comprises:
   a mounting unit for mounting the test body;
   an electric drive unit adapted for mechanically driving the mounting unit and the test body mounted thereon, wherein the electric drive unit comprises an electric linear motor; and
   a control unit adapted for controlling the electric drive unit to accelerate the test body mounted on the mounting unit and for controlling release of the test body from the mounting unit to direct the accelerated test body towards the physical structure for collision, wherein the device is adapted so that the mounting unit and the test body mounted thereon are mechanically driven exclusively and directly by the electric drive unit.

2. The device according to claim 1, wherein the electric drive unit comprises a plurality of, particularly at least three, more particularly at least four, electric linear motors to be operated parallel to one another in a synchronized manner.

3. The device according to claim 1, wherein the control unit is adapted for controlling the electric drive unit to shoot the accelerated test body towards the physical structure for collision.

4. The device according to claim 1, further comprising:
   a stator on which the mounting unit is movable along a predefined trajectory.

5. The device according to claim 4, wherein the stator comprises a guide rail on which the mounting unit is movable along the predefined trajectory.

6. The device according to claim 1, further comprising:
   a measurement unit adapted for measuring data indicative of a motion of the test body mounted on the mounting unit and for supplying the measurement data to the control unit as a basis for controlling the electric drive unit.

7. The device according to claim 6, wherein the measurement unit is adapted to perform a longimetry measurement of the test body mounted on the mounting unit.

8. The device according to claim 1, wherein the mounting unit comprises a recess for receiving a protrusion of the test body for mounting the test body on the mounting unit.

9. The device according to claim 8, wherein the mounting unit comprises a magnetic field generating unit for generating a magnetic field in the recess for receiving, by means of an attracting magnetic force, the protrusion being made of a magnetic material.

10. The device according to claim 9, wherein the control unit is adapted for activating the magnetic field generating unit for generating the magnetic field resulting in the attracting magnetic force in the recess before accelerating the test body mounted on the mounting unit and is adapted for deactivating the magnetic field generating unit for switching off the attracting magnetic field when accelerating the test body mounted on the mounting unit and/or when releasing the test body from the mounting unit.

11. The device according to claim 9, wherein the mounting of the test body on the mounting unit is exclusively accomplished by a force resulting from form closure of the recess with the protrusion in combination with the magnetic field attracting the magnetic protrusion of the test body.

12. The device according to claim 1, further comprising:
   a counterweight configured to be mechanically moved upon mechanically driving the mounting unit and the test body mounted thereon, wherein the counterweight is moved along a moving direction which is oriented oppositely with regard to a moving direction of the mounting unit and the test body mounted thereon.

13. The device according to claim 12, wherein a mass of the counterweight equals a mass of the test body mounted on the mounting unit.

14. The device according to claim 12, further comprising:
   a force converter mechanically coupling the counterweight with the mounting unit and the test body mounted thereon so that the force converter converts a force acting on the mounting unit and the test body mounted thereon into a converted force acting on the counterweight.

15. The device according to claim 14, wherein the force converter comprises a cable pull mechanism having a cable connecting the counterweight with the mounting unit to reverse a force vector acting on the mounting unit and the test body mounted thereon into an inverse force vector acting on the counterweight.

16. The device according to claim 12, wherein the stator comprises a further guide rail on which the counterweight is movable along a predefined further trajectory.

17. A method of investigating a collision between a test body and a physical structure, the method comprising:
   mechanically driving a mounting unit and a test body mounted thereon exclusively and directly by an electric drive unit comprising an electric linear motor; and
   controlling the electric drive unit to accelerate the test body mounted on the mounting unit and to release the test body from the mounting unit to direct the accelerated test body towards the physical structure for collision.

18. A non-transitory computer-readable medium, in which a computer program of investigating a collision between a test body and a physical structure is stored, which computer program, when being executed by a processor, is adapted to carry out or control a method of investigating a collision between a test body and a physical structure, the method comprising:
   mechanically driving a mounting unit and a test body mounted thereon exclusively and directly by an electric drive unit with an electric linear motor; and
   controlling the electric drive unit to accelerate the test body mounted on the mounting unit and to release the test body from the mounting unit to direct the accelerated test body towards the physical structure for collision.

* * * * *